Jan. 19, 1926.
C. F. WOLF
1,570,367
SHACKLE BOLT OILING DEVICE
Filed July 26, 1923
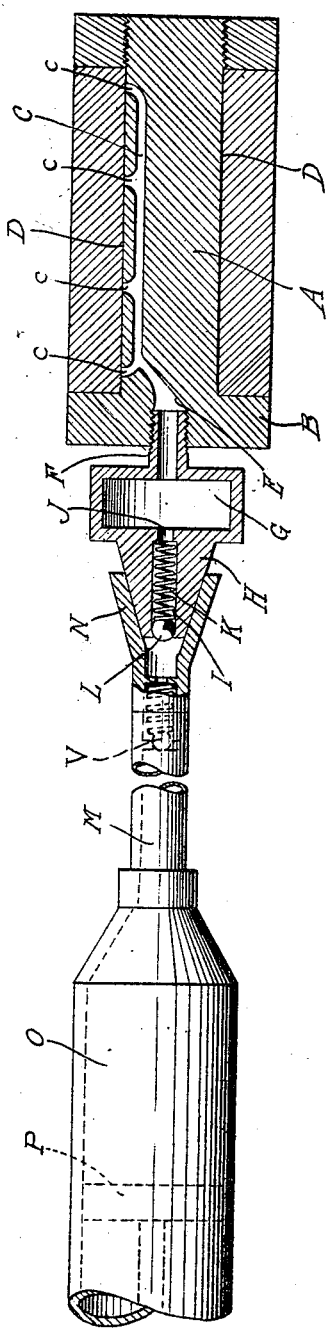
INVENTOR
C.F. Wolf
BY
ATTORNEYS Patented Jan. 19, 1926.

1,570,367

UNITED STATES PATENT OFFICE.

CARL FRED WOLF, OF CHICAGO, ILLINOIS.

SHACKLE-BOLT-OILING DEVICE.

Application filed July 26, 1923. Serial No. 653,979.

*To all whom it may concern:*

Be it known that I, CARL FRED WOLF, a citizen of the United States, and a resident of Chicago, in the county of Cook and State of Illinois, have invented a new and useful Improvement in Shackle-Bolt-Oiling Devices, of which the following is a full, clear, and exact description.

My invention relates to improvements in means for oiling shackle bolts, and it consists in the combinations, constructions, and arrangements herein described and claimed.

An object of my invention is to provide a device for oiling shackle bolts in which the time taken for oiling these devices is greatly reduced.

A further object of my invention is to provide a lubricating device in which the lubrication may be instantly effected and in which means is provided for storing up the oil so that frequent relubrication is unnecessary.

A further object of my invention is to provide a lubricating device which may be instantly applied or removed.

Other objects and advantages will appear in the following specification, and the novel features of the invention will be particularly pointed out in the appended claims.

My invention is illustrated in the accompanying drawing, forming part of this application, in which The figure shows a section through a shackle bolt, and a portion of the lubricating device, a portion of the oiling device being shown in side elevation.

In the drawing A indicates the shank of the shackle bolt and B the head. This bolt is provided with a lubricating groove C which communicates at *c* with the surface of a bearing D.

The head of the bolt is provided with a threaded tapered opening E arranged to receive a tapered threaded pipe portion F, which is carried by a receptacle G, preferably cylindrical in form. This receptacle has on its opposite side a conical-shaped extension H. The extension is provided with a cylindrical bore I which communicates by means of a reduced bore J with the interior of the receptacle G. A spiral spring K is disposed in the bore and bears at one end on the shoulder between the reduced portion J and the bore I. A ball valve L is disposed in the bore and is pushed inwardly to compress the spring. The end of the extension H about the bore is then upset so as to restrict the opening and to provide a seat for the ball L.

Arranged to cooperate with the tapered extension H is a tube M having a flared end portion N. The opposite end of the tube communicates with a cylinder O having a piston P therein which may be operated by any suitable means, not shown. The tube M and its flared end N may be of any suitable materal. The flared end N is designed to fit tightly over the tapered extension H when the device is pushed on.

The cylinder O is designed to contain oil and by forcing the piston P toward the bolt, oil is forced past the ball valve L which opens against the tension spring. The oil fills the receptacle G and passes on into the grooves C. The receptacle and grooves may be filled very quickly by one forward stroke so that the oil in the receptacle is under pressure. The flared end N may then be removed from the extension. The oil in the receptacle will feed into the grooves C from time to time, thereby insuring the proper lubrication of the bolt. The construction described obviates the necessity of fastening the end of the tube M to any part of the bolt, as for instance, by a bayonet joint or the like. All that is necessary is to push the flared end N into the extension and force the piston P forwardly and then remove the device. One charge of oil is sufficient to lubricate the shackle bolt for a long time without requiring any further attention. The device greatly facilitates the lubrication of shackle bolts and cuts down the time required for the operation.

It will be observed that I have provided a means for retaining the oil in the cylinder O, this means consisting of a spring pressed ball valve V. The valve prevents the oil from running out of the cylinder when the tube M is lowered, but will open under the pressure exerted on the oil by the piston P to permit a free flow of the oil into the reservoir G past the valve L in the manner already explained.

I claim:

1. An oiling device for bearings comprising an oil reservoir having a reduced threaded pipe connection on one side thereof for securing said reservoir to a bearing, said reservoir having a conical shaped extension on the opposite side from said threaded pipe connection, said conical shaped extension having a bore extending from the outer end thereof and communicating with the reservoir, and a spring pressed valve disposed within said bore for normally closing the bore.

2. The combination with a shackle bolt having oil grooves, a cylindrical oil reservoir having a reduced threaded pipe connection arranged to be secured to the head of said shackle bolt and for establishing a communication with the reservoir and the oil grooves, said reservoir having a conical-shaped extension on the opposite side from said threaded pipe connection, said conical connection having a bore extending from the outer end thereof and communicating with the reservoir, and a spring pressed valve disposed within said bore for normally closing the latter.

3. The combination with a shackle bolt having oil grooves, a cylindrical oil reservoir having a reduced threaded pipe connection arranged to be secured to the head of said shackle bolt and for establishing a communication with the reservoir and the oil grooves, said reservoir having a conical-shaped extension on the opposite side from said threaded pipe connection, said conical connection having a bore extending from the outer end thereof and communicating with the reservoir, a spring pressed valve disposed within said bore for normally closing the latter, and a force feed lubricating container having a flared end arranged to fit tightly over the tapered extension whereby oil may be forced past the spring pressed valve into said reservoir.

CARL FRED WOLF.